April 12, 1932. W. H. ANDERSON 1,853,109
MACHINE FOR HARVESTING HEADED VEGETABLES
Filed April 14, 1930 4 Sheets-Sheet 1
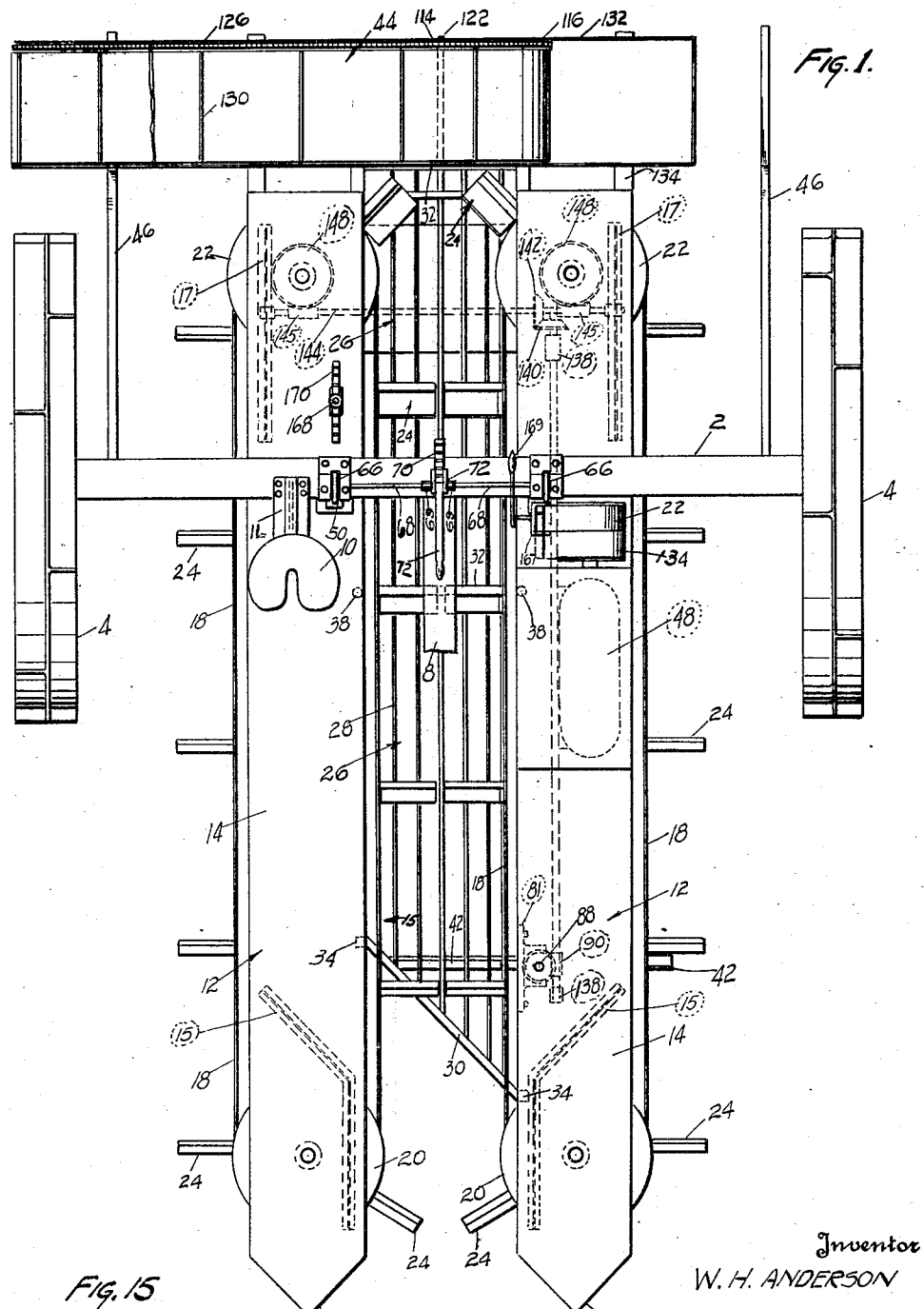

April 12, 1932.　　　W. H. ANDERSON　　　1,853,109
MACHINE FOR HARVESTING HEADED VEGETABLES
Filed April 14, 1930　　4 Sheets-Sheet 2
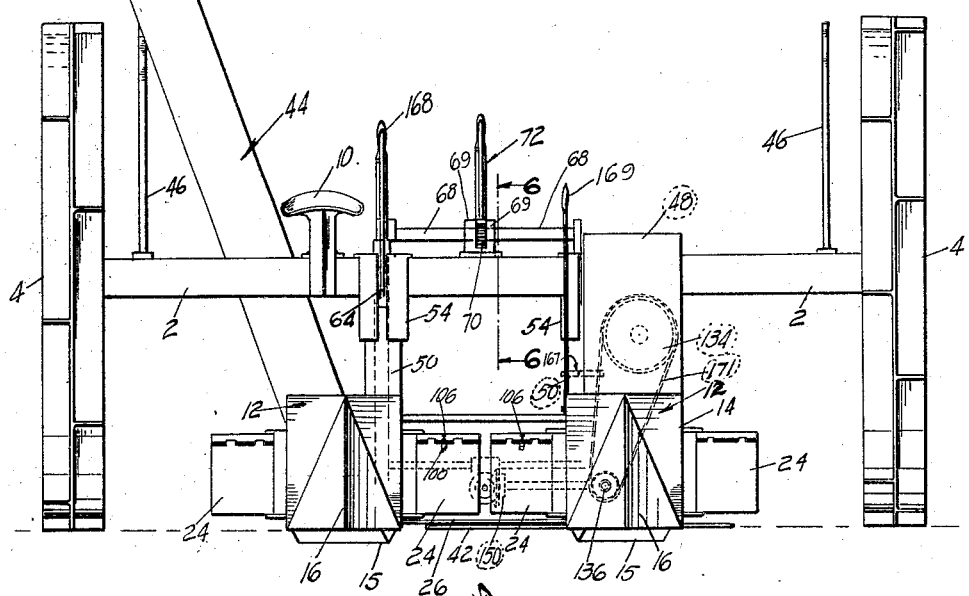
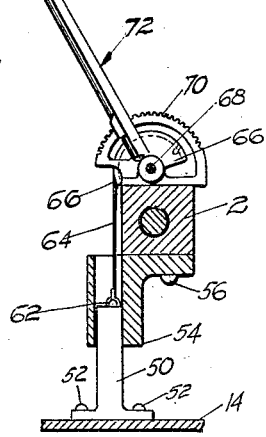
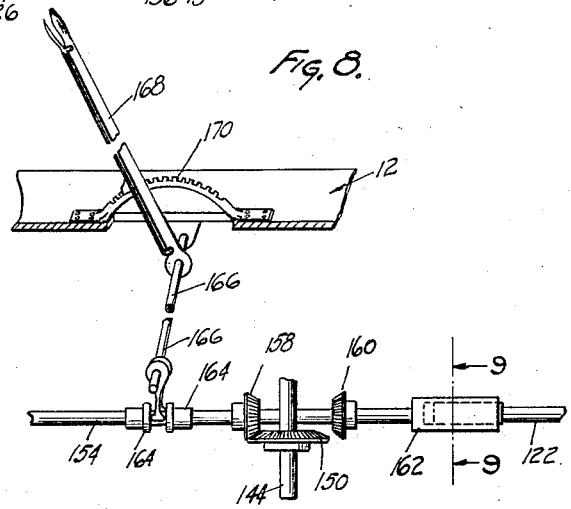
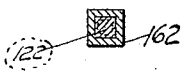
Inventor
W. H. ANDERSON
By Fred D. Hayn
Attorney April 12, 1932. W. H. ANDERSON 1,853,109
MACHINE FOR HARVESTING HEADED VEGETABLES
Filed April 14, 1930 4 Sheets-Sheet 3
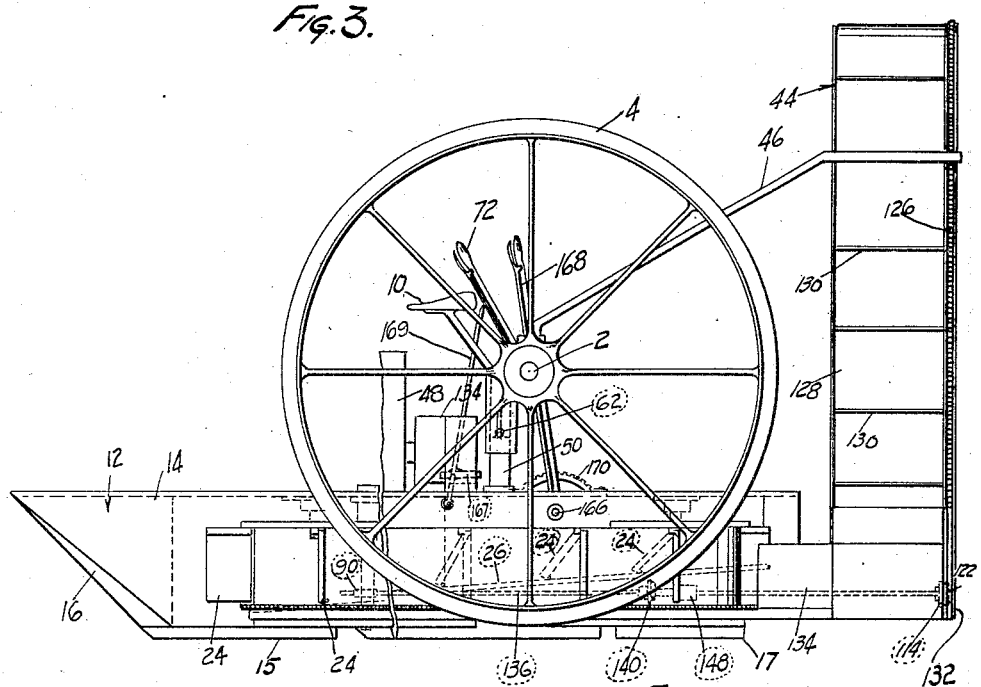
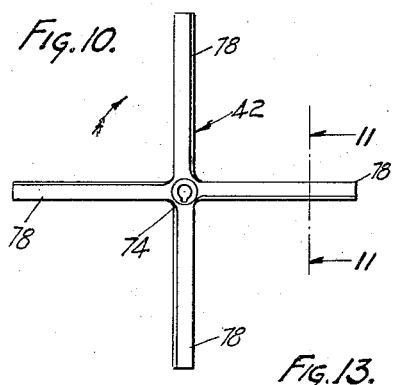
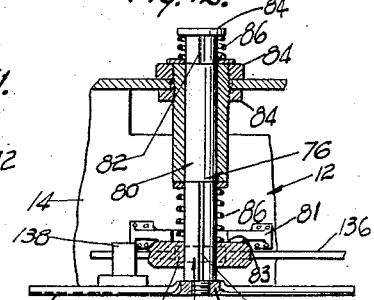
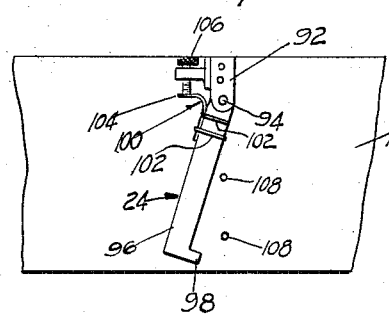
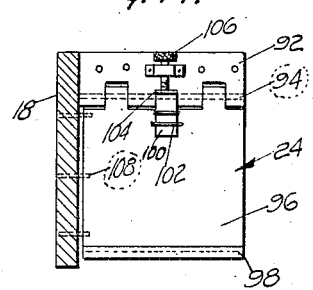
Inventor
W. H. ANDERSON
By Fred D. Hayn
Attorney April 12, 1932.  W. H. ANDERSON  1,853,109
MACHINE FOR HARVESTING HEADED VEGETABLES
Filed April 14, 1930    4 Sheets-Sheet 4
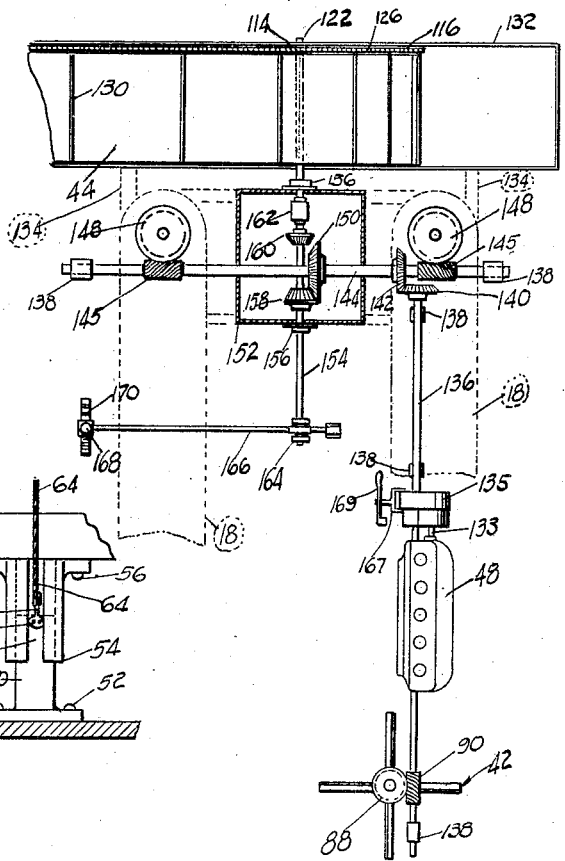
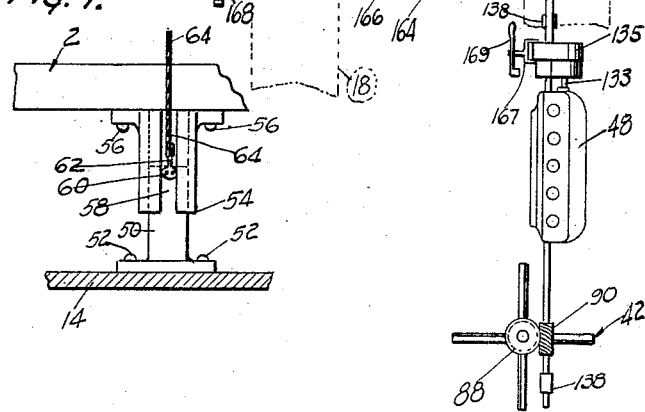
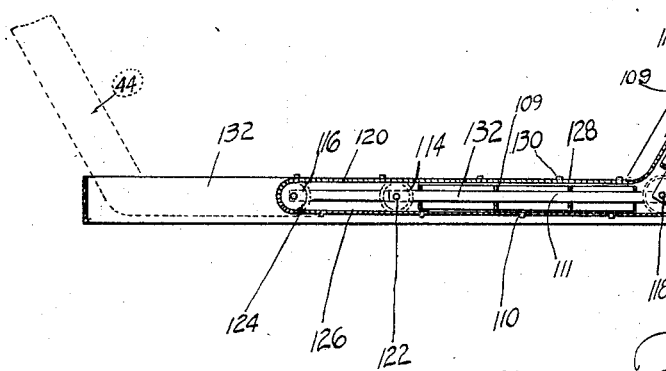
Inventor
W. H. ANDERSON.

Patented Apr. 12, 1932

1,853,109

UNITED STATES PATENT OFFICE

WALTER H. ANDERSON, OF LOS ANGELES, CALIFORNIA

MACHINE FOR HARVESTING HEADED VEGETABLES

Application filed April 14, 1930. Serial No. 444,096.

My invention relates to harvesters, and more particularly to such harvesters as are adapted to harvest headed vegetables, such as lettuce, cabbages, cauliflower and the like, whereby the crop to be harvested is gathered, cut, collected and elevated or delivered to the point or points of discharge.

It accordingly is an object of my invention to provide a novel form of harvester in which a suitable framework is associated in any preferred way with preferably an axle upon which are mounted a pair of wheels, said framework and said axle having means associated therewith whereby said framework may be elevated with respect to said axle so the harvester may be guided about the field, said framework having associated therewith a crop gathering means, preferably in the shape of one or more endless belts, mounted in any suitable manner with respect to said framework, said belts having associated therewith a set of swinging crop gathering and moving sweeps, the crop, as it is gathered, being preferably simultaneously cut by a novel form of cutter, which cutter is resiliently and adjustably mounted on said framework, so said cutter may optionally cut the crop both above and below the soil, there being also associated with said framework, a corp collecting means, preferably positioned in inclined and detachable relation with said framework, the cut and collected crop being carried to a suitable elevator or conveyer, which elevates or conveys same to the point or points of discharge, power driven mechanism being associated with said movable parts so they may be operated in timed relation, and suitable means being also provided for controlling the operation of said power driven mechanism, as well as the direction of movement of said elevator or conveyer.

The above and further objects and advantages of my invention, as will hereinafter more fully appear, I attain by the construction described in the specification, and illustrated in its preferred form on the drawings forming a part of my application.

Reference is had to the accompanying drawings, in which similar reference characters denote similar parts. In the drawings, Fig. 1 is a top plan view of my invention, parts being cut away and fore-shortened, and omitted for the sake of clearness, Fig. 2 is a front elevational view of Fig. 1, Fig. 3 is a side elevational view of Fig. 1, Fig. 4 is a more or less diagrammatic, fragmentary plan view of the power driven mechanism for operating the moving parts of the machine, the framework being shown in dotted lines, Fig. 5 is an enlarged longitudinal sectional view of the elevator or conveyer, the dotted lines indicating the two positions said elevator may assume on either side of the machine, Fig. 6 is a part sectional and part elevational view of the frame elevating means, and the means for holding same locked in its elevated position, Fig. 7 is a part sectional and part elevational view of Fig. 6, Fig. 8 is a perspective view of the mechanism for reversing the direction of the elevator or conveyer, parts being shown in section, Fig. 9 is a cross-sectional view, taken on the line 9—9, Fig. 8, Fig. 10 is an enlarged top plan view of the cutter, Fig. 11 is an enlarged cross-sectional view, taken on the line 11—11, Fig. 10, Fig. 12 is an enlarged cross-sectional view through the cutter, and resiliently and adjustably mounted floating shaft therefor, Fig. 13 is an enlarged fragmentary top plan view of one of the belt crop gatherer sweeps, illustrating its mounting thereon, Fig. 14 is a front elevational view of Fig. 13, looking from the left of said figure, and Fig. 15 is a fragmentary elevational view showing the manner in which the grid or crop collecting means is associated with the framework of the machine.

Describing my invention more in detail, in its broader aspect said invention comprises a machine especially adapted for harvesting headed vegetables, such as cabbages, cauliflower, lettuce and the like, and consists of a framework suitably suspended from an axle upon which are mounted a pair of wheels by means of which said machine may be propelled about the field, either by animals, tractor, or in any other suitable way, said framework, when elevated, permitting the machine to be guided about the field as well as permitting an elevator or conveyer, for elevating or conveying the harvested crop to the point or points of discharge, to be adjusted from one side to the other of the machine.

Said framework is adapted to be juxtaposed or to straddle the crop to be harvested, and associated therewith in any preferred way are the crop gathering and collecting means, in the form of one or more endless belts provided with a set of sweeps, and a cutting means or cutter, preferably of novel form, for severing the crop from its roots as it is gathered, said sweeps moving the harvested crop on a novel form of grid or crop collecting means, preferably inclined with respect to the framework, said sweeps moving the collected crop to a novel form of conveyer or elevator, which elevates or conveys the harvested crop to the point or points of discharge, which may be a wagon, or set of receptacles, or the like.

The moving parts of the machine are moved by any suitable power driven mechanism, mounted in suitable bearings in the framework, and may be driven by a suitable motor, such as an internal combustion engine, any suitable means, such as a pulley and belt shift, manually operated, being provided to control said mechanism, manual means being also provided to reverse the direction of movement of the elevator or conveyer.

The framework has associated therewith on its under side, a number of guiding and supporting sway strips, one of which is adapted to prevent the soil from reaching the cutter. Although any preferred number of these may be employed, four are shown, the two forward ones being of different form than the two in the rear of the machine.

More specifically, my invention comprises an axle 2 of suitable form, dimensions and material, and on said axle are mounted the propelling wheels 4, said axle being provided with a suitable tongue or tractor hitch 8 by which the machine may be drawn, either by animals or tractor, said axle being also provided with a driver's seat 10, mounted on said axle in any desired manner, as by the bolted support 11.

Unconnected in any way with the axle 2, except in the manner presently to be described is the framework, designated generally by the reference numeral 12, said framework preferably consisting of a pair of longitudinal members 14, which may be angular in form, and if desired, rectangular in cross-section the parts being in practice shaped to form, and welded together in any suitable manner; and as a guiding means the front portions of the members 14 are pointed as at 16.

The members 14 are adapted to be supported upon the ground by the forward sway strips 15 (Figs. 1, 2 and 3) and the rear sway strips 17, the two former being formed as shown to deflect the soil as the machine is moved forwardly, the forward right strip 15 preventing the soil from reaching the cutter 42, hereinafter more particularly described.

The crop gathering mechanism, with means for selectively engaging each head as the framework 12 is passed over the crop, so it may be harvested, comprises at least one movable means, in the shape of an endless belt 18, said belt, if desired, being sectional and having its parts secured together, said belts being passed over suitable front pulleys 20, and rear pulleys 22, the framework 12 being cut away for this purpose, and the mounting any that in practice may be preferred. On the belts 18 are mounted the crop gathering and engaging sweeps 24, hereinafter to be more particularly described.

Positioned between the two longitudinal members 14 of the framework 12 is the crop collector or carrying grid 26, which is preferably positioned in inclined relation with said members, as indicated by the dotted lines in Fig. 3, said grid being preferably constructed of a set of longitudinal strips or elements 28, and a set of cross bars 30, and 32, at least one of which, such as the front bar 30, being diagonally positioned with relation to the longitudinal strips, to facilitate the depositing of the harvested crop on said grid, as will presently be explained.

The diagonal bar 30 is provided at each end with a knob 34, which are adapted to engage in horizontal slots 36, formed in the sides of the members 14, and the bar 32 formed with similar knobs 38, but differently positioned with respect to said bar 32, in the vertical slots 40 of the members 14, these features permitting the grid 26 to be removed from the framework when desired and when needed.

Preferably but one cutting means or cutter 42 is provided for severing the heads from the vegetables, which cutter is mounted below the right hand member 14, and is preferably of novel rather than conventional form, as will be hereinafter more particularly explained.

Associated in a suitable way with the framework of the machine is a conveyer or crop elevating means, designated generally by the reference numeral 44, (Figs. 1, 2, 3 and 5) which will hereinafter also be more particularly described. Said conveyer or crop elevating means may be swung from one side of the machine to the other, so as to discharge the harvested crop at any point or points desirable, the axle 2 having associated therewith in any manner in practice preferred, as by welding a pair of conveyer or elevator supports or rests 46. (Figs. 1, 2 and 3.)

Mounted upon the machine in any suitable position, and in any suitable way, and, as shown on the drawings, may be mounted on the right hand member 14 (Fig. 1) a motor 48, which may, if desired, comprise any conventional form of internal combustion engine, and said motor is adapted to drive in time relation the pulleys 22 and 24, the cutter 42, and the conveyer 44, by the mechanism depicted in suggestive form in Fig. 4. It will be of course understood that any other means for driving said elements may be used, and still remain within the province of my invention.

The general operation of the mechanism as thus far described is as follows:

A tractor or a set of animals are hitched to the tongue 8, the operator occupying the seat 10, raises the frame elevating means, to be more particularly described later, so the machine may be guided about the crop field, the weight of the various parts of the machine being borne solely by the wheels 4. Having reached the rows of the crop to be harvested, the framework is lowered, the members 14 straddling said row.

The motor 48 is now set in operation, and by means of the power transmission means to be hereinafter more fully described, the belts 18 and their sweeps 24, as well as the cutter 42 and conveyer 44 are set in motion.

The first vegetable reached may not at first be gathered, but will be by the succeeding sweeps that move around the front ends of the members 14. The missing of one or two heads is accordingly immaterial since the succeeding sweeps will take care of same. The first head, then, is engaged by the two sweeps 24 as they are in alignment, and the cutter 42, preferably rotating clock-wise toward the diagonal bar 30, severs the head from its roots, the cutter by its novel form, assisting the sweeps 24, in depositing said head upon the grid 26, where said head and the succeeding heads are swept up the inclined surface of said grid until the end of the machine, after which said heads are swept onto the conveyer or elevator 44, and at its end discharged into a following wagon, or receptacles of any suitable kind positioned on the field.

Bearing in mind this general description of the operation of the machine, the various parts will now be more specifically described:

Framework elevating means

This mechanism is more particularly shown in Figs. 6 and 7, but reference should be had also to Figs. 1, 2, and 3; said mechanism comprises a standard 50, secured in any suitable way to the members 14 of the framework 12, as by the bolts 52, there being two such standards, one for each of the members 14, the parts being identical; hence but one set will be described.

The standard 50 is slidably mounted on a bearing 54, suitably secured to the bottom of the axle 2, as by the bolts 56, said bearing having a front slide way or guide 58 in which may be positioned the knob 60 (Fig. 7) to provide for a steady reciprocation of the standard 50 within the bearing 54, and secured to the top of the standard in any suitable way as by means of the eye 62, is the cable 64, adapted to be secured to and move with the grooved wheels 66 (Fig. 6), which wheels are keyed to a cross-shaft 68, mounted in bearings 69 (Figs. 1 and 2) and bearing in its middle the sector ratchet 70, adapted to be engaged by the conventional manual lever and pawl device 72 (Fig. 6) so the entire framework including the conveyer 44, may be lifted bodily, so the machine may be guided about the crop field, the enormous leverage obtainable by the construction just described making this manipulation an easy and simple matter.

The cutter or cutting mechanism

Attention is more particularly directed to Figs. 10 and 11, but reference should also be had to Figs. 1, 2, 3 and 12. Said cutter 42 is preferably provided with a suitable hub, 74, which is keyed and screwed or otherwise secured to a floating and reciprocating shaft 76, which will presently be described in detail, a set of any preferred number of cutter arms 78, extending radially therefrom, said cutter being adapted to be rotated in a clockwise direction, for the purpose, as previously mentioned, to assist in pushing the harvested crop onto the collector grid 26, each arm being preferably rhomboid in cross-section (Fig. 1) for this purpose, the arrow in Fig. 10 indicating the direction of rotation. The cutter 42 is preferably reversible so both sides may be used in cutting, the cutter edge coacting with the bar 30 of the grid 26, much in the manner of a pair of scissors.

The floating cutter shaft

Reference is more particularly had to Figs. 12 and 3. The cutter 42 is detachably associated with a shaft 80, provided with a set of vertical slots or grooves 82, extending but a part of the length thereof so that a set of adjusting nuts 84, provided with keys to move in said slots or grooves as the cutter shaft 80 floats up and down to accommodate itself to soil conditions, a set of tension springs 86 being provided as shown so said cutter will be resiliently mounted, said shaft by reason of the nuts 84, being adapted to be adjusted so that the cutter 42 will cut below the soil, as in the case of a lettuce crop, said shaft being operated by a pinion 88 mounted thereon, which pinion in turn is actuated by a worm gear 90 (Fig. 4, more particularly) in the manner hereinafter more particularly described.

Sweeps or crop gathering means

These are designated generally by the reference numeral 24, and are more particularly shown in Figs. 13 and 14, but reference should be had also to Figs. 1–3 inclusive.

The sweeps 24, as previously explained, are adapted to gather the crop, so the cutter 42 may sever same from its roots, which sweeps are mounted upon the belts 18 at suitable intervals, and are adapted to move relatively to said belts as well as with them.

As seen in Fig. 13, each sweep has an anchoring means or cleat 92, riveted to or otherwise associated with the belts 18, and preferably pivoted or hinged to said anchoring means 92 by the pivot or hinge construction 94, is the body 96 of the sweeps, which body has preferably mounted upon its free end a crop engaging lug or other means 98, to facilitate moving the crop up the inclined grid 26 (Fig. 3, more particularly), said sweeps assuming the position depicted in Fig. 3 when they are moving over said grid. It is of course essential for the proper functioning of the sweeps 24, that they be resiliently mounted, and at the same time capable of having said resiliency adjusted.

For this purpose I provide a suitable spring means 100, secured in any suitable manner to the body 96 of the sweep 24, such as the staples 102, and the upper end 104 has a set screw 106 associated as preferred with the anchoring means 92. To limit the movement of the sweeps 24, I may provide the belt 18 at the required position with a set of stop pins 108, of which there may be any preferred number. Of course other stop means may be provided, or the resilient means and the adjustment therefor, may be in practice varied as desired.

The elevating or conveying means

Reference is more particularly had to Fig. 5, to be considered in connection also with Figs. 1, 2 and 3.

The conveyer or elevating means 44, which may be swung to either side of the machine, as previously explained and be made to rest upon the supports 46, so that the harvested crop may be discharged from either side of the machine, comprises a suitable, but preferably light framework, consisting of side boards 110 between which are mounted for rotation a set of pulleys 112, 114 and 116, the axles 118 of which are mounted in said boards, and in the boards 111, having spacers 109, and thereby form a rigid construction, said framework having an extension 120 (Fig. 5) pivoted to swing on the axle 122 of the drive pulley 114, and the pulley 114, as well as the pulley 116 are each provided with a sprocket wheel 124, over which is positioned a chain drive 126, (Figs. 1, 3 and 4) the drive pulley 114, as presently to be explained, driving the other pulleys through a transmission mechanism connected to the drive shaft of the motor 48.

Over the said pulleys an endless slack conveyer or elevator belt 128 is adapted to be positioned, said belt having a set of harvester crop conveying cleats 130, secured to said belt in any manner in practice preferred, and being taut at the bottom and slack at the top (Fig. 5).

The shaft 122 of the pulley 114 is mounted in an end plate 132, (Figs. 1, 3, 4 and 5) which plate is secured in any suitable way as by the extensions 134 (Fig. 3) to the longitudinal members 14 of the framework 12, said framework by said means supporting the entire conveyer or elevator and its adjuncts. The dotted lines in Fig. 5 indicate the portion of the conveyer after it has been swung to the opposite side of the machine.

In so doing, the framework 12 must first be elevated by the means depicted in Fig. 6, so as to give the proper clearance for the extension 120, which extension pivots about the shaft 122 and is swung to the right of Fig. 5, said extension serving to receive the harvested crop collected on the grid 26, and dropped thereon, after which the cleats 130 carry said crop to the top, where it is discharged into a wagon or a set of receptacles following the machine or placed at different points along the crop field.

The transmission mechanism

This is more particularly shown in Fig. 4, to be used in connection with Figs. 1–3 and also Fig. 8.

The shaft 133 of the motor 48 has a belt drive and pulley shift 135, to provide for a direct drive and for idling, said shaft 133 driving the longitudinal shaft 136, mounted in suitable bearings 138 on the framework 12, said shaft having keyed thereto the worm gear 90 to drive the pinion 88 of the cutter 42, and at its other end a bevel gear 140, in mesh with a complementary bevel gear 142 on a driven shaft 144, which shaft is provided with the roller or spool pinions 148 of the pulleys 22 (Fig. 1) over which the belts pass. The conveyer or elevator 44, is driven from the shaft 144 by means of the bevel gear 150 keyed thereon, means being provided for reversing the direction of the movement of the conveyer or elevator belt 128 (Fig. 5), which means will now be described.

Conveyer or elevator shifting means

See more particularly Figs. 4 and 8, to be read with Figs. 1–3.

Positioned within a casing 152, (Fig. 4), which casing is connected with the framework 12 in any suitable way, is a stub shaft 154, mounted to be reciprocated and rotate in bearings 156 suitably associated with said casing. On the shaft 154 is mounted a bevel gear 158, adapted to be shifted toward and away from the gear 150, and when free, being adapted to stop the conveyer or elevator 44, that is, to provide for idling.

The pulley shaft 122 is provided with a complementary bevel gear 160, and also a spline 162 in the casing 152, so either of the gears 158 or 160 may optionally be shifted to mesh with the gear 150 or be free therefrom, so the conveyer or elevator may be reversed, or given a direct drive or idle, a connection 164 (Fig. 8) connected to the shaft 166, and operable by the lever 168, and square ratchet teeth 170 (Fig. 8) mounted upon the framework 12 in any suitable way, so the said gears may be made to function as desired and locked in such position. Since all of said structure is more or less conventional, it is thought further description and illustration unnecessary.

As seen in Figs. 4 and 3 a belt shift means 167, operated by a conventional shift lever 169, may be provided to shift the belt 171 (Fig. 2).

If desired, the framework 12 may be provided with a means for preventing the pinion 88 from vertical movement as the shaft 80 is reciprocated up and down. Such a means is shown in Figs. 12 and 1 and comprises a suitable support 81, having a depressed center portion 83 (Fig. 12), which support may be bolted or otherwise associated with said framework.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

I claim as my invention:

1. In a machine for harvesting headed vegetables, longitudinally movable means for engaging the heads of said vegetables so said heads may be severed from their roots, a vegetable head carrying means over which said first mentioned means are adapted to move, and a revoluble cutter for simultaneously severing said heads when engaged by said longitudinally movable means, and pushing said heads upon said carrying means.

2. In a headed vegetable harvesting machine, a framework, means associated with said framework whereby said machine may be propelled across the crop to be harvested, means for raising and lowering said framework with respect to said crop, means for engaging said vegetables selectively so they may be harvested, means associated with said framework whereby the heads of said vegetables may be severed, and means for elevating and discharging optionally upon each side of said machine the harvested vegetables.

3. In a headed vegetable harvesting machine, a framework, means associated with said framework whereby said framework may be propelled over the crop to be harvested, a set of harvester belts adapted to be moved relatively to said framework, vegetable engaging sweeps movable with said belts, a motor for operating said belts and said sweeps, a cutter for selectively severing the heads of each of said vegetables, and means associated with said framework for automatically discharging the harvested crop optionally from each side of said machine.

4. In a headed vegetable harvester, a framework, means for manually raising and lowering said framework, movable vegetable engaging means associated with said framework, means for selectively severing the heads of said vegetables as they are engaged, sets of means for guiding said framework with respect to the crop to be harvested, at least one of said sets of means functioning to keep the soil away from said severing means, and means associated with said framework for optionally discharging the harvested crop on each side of said harvester.

5. In a vegetable head harvester, a framework adapted to be propelled over the crop to be harvested, means associated with said framework for selectively engaging each vegetable to be harvested, a cutter means mounted on said framework adapted to cut each vegetable as it is engaged, means associated with said framework for keeping the soil away from said cutter means as the harvester is propelled forwardly, means for adjusting said cutter with respect to said framework to conform with crop and soil conditions, and means associated with said framework for optionally discharging the harvested crop on either side of said harvester.

6. In a vegetable head harvester, means for preventing the soil from reaching the cutter means of said harvester, said means comprising a set of sway strips mounted upon the lower portion of the framework of said harvester, said strips being triangular in cross-section, at least one of said strips being so positioned with respect to said framework that the soil will be swept away from said cutter as said harvester is propelled forwardly.

7. In a headed vegetable harvester, a combined vegetable head severing and propelling means comprising a hub, and a set of combined knife and propelling arms extending radially from said hub, each of said arms being rhomboid in cross-section.

8. A mounting for the cutter of a headed vegetable harvester whereby said cutter may be held in adjustable and resilient relation with respect to said harvester so said cutter will automatically adapt itself to field conditions of soil and crop, said mounting comprising an adjustable shaft upon which said cutter is mounted, a pinion for rotating said shaft, means associated with the framework of said harvester for holding said pinion from vertical movement, sets of resilient means surrounding said shaft, at least one of said resilient means being adapted to engage said first mentioned means, and means for adjusting the tension of said resilient means.

9. A vegetable head carrying grid adapted for special use in connection with a vegetable head harvester, said grid comprising a framework composed of a set of longitudinal strips of varying length, cross bars connecting the respective ends of said strips, at least one of which is positioned in diagonal relation with said strips to assist the cutter of said harvester to cut the crop, and a knob on each end of each of said cross bars, said knobs being adapted to engage sets of vertical and horizontal slots in inclined and in detachable relation with respect to said framework.

10. In a vegetable head harvester, a framework adapted to straddle the rows of the headed vegetables to be harvested, gathering means for selectively gathering said crop, cutting means for selectively cutting each vegetable as it is gathered, means for discharging the harvested crop optionally upon each side of said harvester, and means for supporting said framework on the ground, said means comprising a set of forward sway strips, at least one of which is adapted to divert the soil away from said cutting means, and a set of rear sway strips, said strips being positioned on said framework in off-set relation therewith.

11. In a vegetable head harvester, including means for gathering, cutting and collecting the crop to be harvested, the combination of a framework, a wheel axle from which said framework is supported, means for raising and lowering said framework, said means comprising one or more standards secured to said framework, one or more guides, secured to said axle, in which said standards are adapted to be reciprocated, one or more pulleys mounted upon said axle, means for connecting said standards to said pulleys, manual means for turning said pulleys, and means associated with said manual means for locking same in adjusted position.

12. In a harvester including a framework, crop gathering, cutting and collecting means associated with said framework, the combination of an end board associated with said framework, a crop conveyer associated with said board and said framework, said conveyer comprising a set of pulleys, one of said pulleys comprising means for driving said conveyer, an endless slack belt positioned over said pulleys, the lower side of which is taut when said conveyer is in operation, a bearing on said framework in which the shaft of said driving pulley is adapted to turn, means associated with said conveyer for preventing the falling off of the crop as it is elevated, and means associated with said harvester whereby said conveyer may be swung to either side and supported in each position.

13. In a harvester, a framework, a pair of wheels, an axle upon which said wheels are adapted to turn, means associated with said framework and said axle whereby said framework may be lifted and held in position so a framework supported by said axle, crop is harvested, crop gathering means operable on said framework, cutting means on said framework adapted selectively to cut said crop as it is gathered, crop collecting means detachably associated to said framework, means for elevating the collected crop to the point of discharge, and power operated mechanism for driving said gathering means, said cutting means, and said elevating means.

14. In a harvester, including a framework and means for gathering, cutting and collecting the crop to be harvested, the combination of a conveyer positioned at the rear of said framework, said conveyer comprising a set of pulleys, one of which is adapted to be rotated by the power driven mechanism of said harvester, an endless slack belt travelling on said pulleys, a set of crop carrying cleats on said belt, means juxtaposed to both sides of said belt to prevent said crop from falling off said conveyer as it is moved, and means associated with at least one of said pulleys, whereby the others may be driven thereby.

15. In a harvester, a pair of wheels, an axle upon which said wheels are adapted to rotate, a framework supported by said axle, crop gathering means adapted to be moved on said framework, crop cutting means movable on said framework, crop collecting means over which said crop gathering means is adapted to be moved, said crop collecting means being inclined with respect to said framework, an elevator for elevating the harvested crop to the point of discharge, mechanism for moving said crop gathering means, said crop cutting means, and said elevator, a motor for operating said mechanism, and means for controlling the operation of said motor.

16. In a harvester, a pair of wheels, an axle for said wheels, a framework, means associated with said axle whereby said harvester may be propelled, means associated with said framework and said axle whereby said framework may be elevated so it may be guided about the field, a set of pulleys mounted to turn on said framework, one or more endless belts adapted to be moved over said pulleys, crop gathering and moving means associated with said belts, cutting means for cutting said crop as it is gathered, a crop elevator associated with said framework for elevating the gathered crop to the point or points of discharge, mechanism for actuating said belts, said crop gathering and moving means, and said elevator in timed relation, a motor for operating said mechanism, and means for controlling said motor.

17. In a harvester, a framework, crop gathering means associated with said framework, crop cutting means movable on said framework, crop elevating means for elevating the harvested crop to the point or points of discharge, mechanism for operating said crop gathering means, said crop cutting means and said crop elevating means in timed relation, a motor for operating said mechanism, means for controlling said motor, and manual means for controlling the direction of movement of said crop elevator.

In testimony whereof I have signed my name to this specification.

WALTER H. ANDERSON.